United States Patent [19]

Chabert

[11] Patent Number: 4,736,440
[45] Date of Patent: Apr. 5, 1988

[54] PROCESS FOR THE PROCESSING OF DIGITIZED SIGNALS REPRESENTING AN ORIGINAL IMAGE

[75] Inventor: Bernard Chabert, Vinay, France

[73] Assignee: Commissariat a l'Energie Atomique, Paris, France

[21] Appl. No.: 872,177

[22] Filed: Jun. 9, 1986

[30] Foreign Application Priority Data

Jun. 10, 1985 [FR] France ............................ 85 08739

[51] Int. Cl.$^4$ .............................................. G06K 9/00
[52] U.S. Cl. ......................................... 382/41; 382/27
[58] Field of Search .................. 382/21, 22, 60, 41, 382/27, 42

[56] References Cited

U.S. PATENT DOCUMENTS 4,174,514  11/1979  Sternberg ............................ 382/49
4,542,527   9/1985  Tsunekawa ......................... 382/27
4,550,437  10/1985  Kobayashi et al. ................. 382/27

OTHER PUBLICATIONS

Kung et al., "A Systolic 2-D Convolution Chip", 1981 IEEE Computer Society Workshop on Computer Architecture..., 11/11-13/81, pp. 159-160.
White, "Architecture for a Digital Programmable Image Processing Element", *ICASSP 81 Proceedings*, 3/30,31 & 4/1/1981, pp. 658-661.

Primary Examiner—Leo H. Boudreau
Attorney, Agent, or Firm—Michael N. Meller

[57] ABSTRACT

In a process for processing digitized signals representing an original image, the image is defined by scanning lines having a predetermined number of image elements or pixels, each pixel being defined by a predetermined number of bits. The process consists of defining a basic processing module by convolution of pixels of a basic image having N pixels per line. Each pixel is processed in a window of dimensions $L \times P$. The process then consists of interconnecting modules identical to the basic module in accordance with a network in which the number of basic modules and their interconnections are dependent on the number of bits defining each pixel of the image to be processed, the number of pixels per line of the image and the dimensions of the chosen processing window.

4 Claims, 6 Drawing Sheets

PROCESS FOR THE PROCESSING OF DIGITIZED SIGNALS REPRESENTING AN ORIGINAL IMAGE

BACKGROUND OF THE INVENTION

The present invention relates to a process for the processing of digitized signals representing an original image and in particular an image defined by scanning lines, such as e.g. an image produced from video signals. This invention applies to the restoration and improvement of contrasts in video-type images, to the detection of the contours and the structuring of the images.

It is known to process digitized images representing an original image, defined by scanning lines, using a module making it possible to process each image element or picture element (called "pixel") using a mathematical or so-called convolution method. Each image element or pixel $a_{ij}$ of the original image to be processed is defined by its intensity a in the form of E bits and its coordinates i and j, i being the number of a considered scanning line of said original image and j the number of the picture element on said scanning line. The original image is processed by convolution, by a convolution window of dimensions L×P comprising L lines of P coefficients. Each of these weighting factors or coefficients $C_{l,k}$ is defined by its value C and its coordinates l and k within the window. Each window is centred on the corresponding image element $a_{ij}$. The processing module supplies for each image element $a_{ij}$ of the original image, an image element $b_{ij}$ of a convoluted image, defined by its intensity b, in the form of G bits and its coordinates i and j. The image element $b_{ij}$ is obtained from successive sums of products defined by the relation:

$$b_{i,j} = \sum_{l=1}^{L} \sum_{k=1}^{P} \left( a_{i+l-\frac{L+1}{2}, j+k-\frac{P+1}{2}} \right) \times c_{l,k}.$$

In this relation l varies from 1 to L and k varies from 1 to P. Obviously, i, j, l, k, L, P, E, G are integers.

A known convolution processing module is e.g. described in the journal Computer Vision, Graphics and Image Processing, vol. 27, pp. 115 to 123, 1984. A module of this type is also described in IEEE article entitled "Large Array VLSI Filter", vol. 83-CH 1929-9, 1983, pp. 15 to 21.

The processes for the processing of digitized signals representing an original image using this type of modulus only make it possible to process images in which each line comprises a predetermined number N of image elements, each image element being represented by a fixed number E of bits and in which the convolution processing window has fixed dimensions L×P and non-programmable coefficients. Thus, with a given convolution processing module it is not possible to process images in which the number of picture elements per line differs from that for which the module is designed, or to process images in which each picture element is represented by a number of bits differing from that of the picture elements for which the module is designed. It is also very difficult when using such a module to process images in which the convolution window does not have the dimensions L×P for which the module was designed. Generally, the processing of the image elements of an image, whose characteristics do not correspond to those of the picture elements of the image to be processed is impossible, even when using complicated circuits associated with said module. Thus, for an image having predetermined characteristics (number of picture elements per line, number of bits defining each picture element, convolution window dimensions), it is necessary to construct a specific model, bearing in mind the characteristics of said original image to be processed in order to obtain a convoluted image. This also applies in the case of an application chain and when it is necessary to modify the coefficients of the convolution window.

SUMMARY OF THE INVENTION

The object of the present invention is to obviate these disadvantages and more particularly supply a process for the processing of digitized signals, representing an original image defined by the scanning lines, without it being necessary to design a specific module. By associating basic modules making it possible in each case to process one basic image having predetermined characteristics (number of image elements per line, number of bits per image element, dimensions of the convolution window of a predetermined magnitude), this process makes it possible to process an original image, no matter what the number of picture elements of each of the lines of said image, or no matter what the number of bits defining each image element of the image, or no matter what the dimensions of the convolution window defined for the processing of each image element of said original image, or no matter what the values of the convolution window coefficients.

The invention specifically relates to a process for the processing of digitized signals representing an original image defined by the scanning lines, each having a predetermined number of image or picture elements, each defined by a predetermined number of bits, wherein it comprises selecting basic modules for the processing by convolution of image elements of a basic image, comprising N image elements per line, each defined by E bits, each image element of the basic image being processed in a convolution window defined by its dimensions L×P, L being the number of lines in the window and P the number of image elements of each line in said window, said basic module comprising at least one input for the data to be processed for receiving the E bits of each image element of a line of N image elements and at least one output for supplying N processed data corresponding to the processing of each image element of the basic image, the process then consisting of interconnecting modules identical to the basic module for obtaining the convoluted image of the original image in accordance with a network in which the number of modules and their interconnections depend on:
 the predetermined number H of bits defining each image element of the original image, said number H being a multiple of the number E of bits defining each image element of the basic image, such that H=n×E,
 the predetermined number N' of image elements per original image line, said number N' being a multiple of the number N of image elements per line of the basic image, such that N'=q×N,
 dimensions L'×P' of a chosen window for processing each image element of the original image, said dimensions exceeding the dimensions L×P of the basic module window.

According to another feature of the invention, in the case where the number H of bits of each image element of the original image is a multiple of the number E of bits of each image element of the basic image, such that $H = n \times E$, it consists of interconnecting n basic modules in series, so that a processed data output of one module is connected to a processed data input of the following module, the H bits of each image element of the original image being subdivided into n groups of E bits, each module receiving at its input for data to be processed a corresponding group of E bits, the processed data output of the final module of the series supplying the bits of each image element of the convoluted image.

According to another feature, in the case where the predetermined number N' of image elements per line of original image is a multiple of the number N of image elements per line of the basic image, such that $N' = q \times N$, it consists of marking from rang 1 to rank q each group of N image elements of the original image and interconnecting q basic modules marked from rank 1 to rank q, so that for each line of the original image, the rank 1 module receives the bits of each image element of the group of N image elements of rank 1, as well as the bits of the $(p-1)/2$ preceding image elements and the bits of the $(p-1)/2$ following image elements and so on, so that the rank q module receives the bits of the group of the N image elements of rank q and receives the bits of the $(p-1)/2$ preceding image elements and the bits of the $(p-1)/2$ following image elements, each module supplying at its processed data output N corresponding image elements of each line of the convoluted image.

According to another feature, in the case where the dimensions $L' \times P'$ of a window chosen for processing each image element of the original image exceed the dimensions $L \times P$ of the processing window of the basic module, it consists of interconnecting $r \times s$ basic modules in r rows and s columns, so that the s modules of the first row receive the bits of each image element of S groups of $N+P-1$ image elements of the original image, each group being displaced by P image elements with respect to the former and wherein the $r-1$ modules of each of the columns receive the bits of image elements already processed in the preceding module of the same column, the process then consisting of interconnecting adders available in each module so as to form the sum of the partial convolution results supplied by each module on a serial output (SSPL), said summation of $r \times S$ partial results being performed in series in adders having two inputs.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
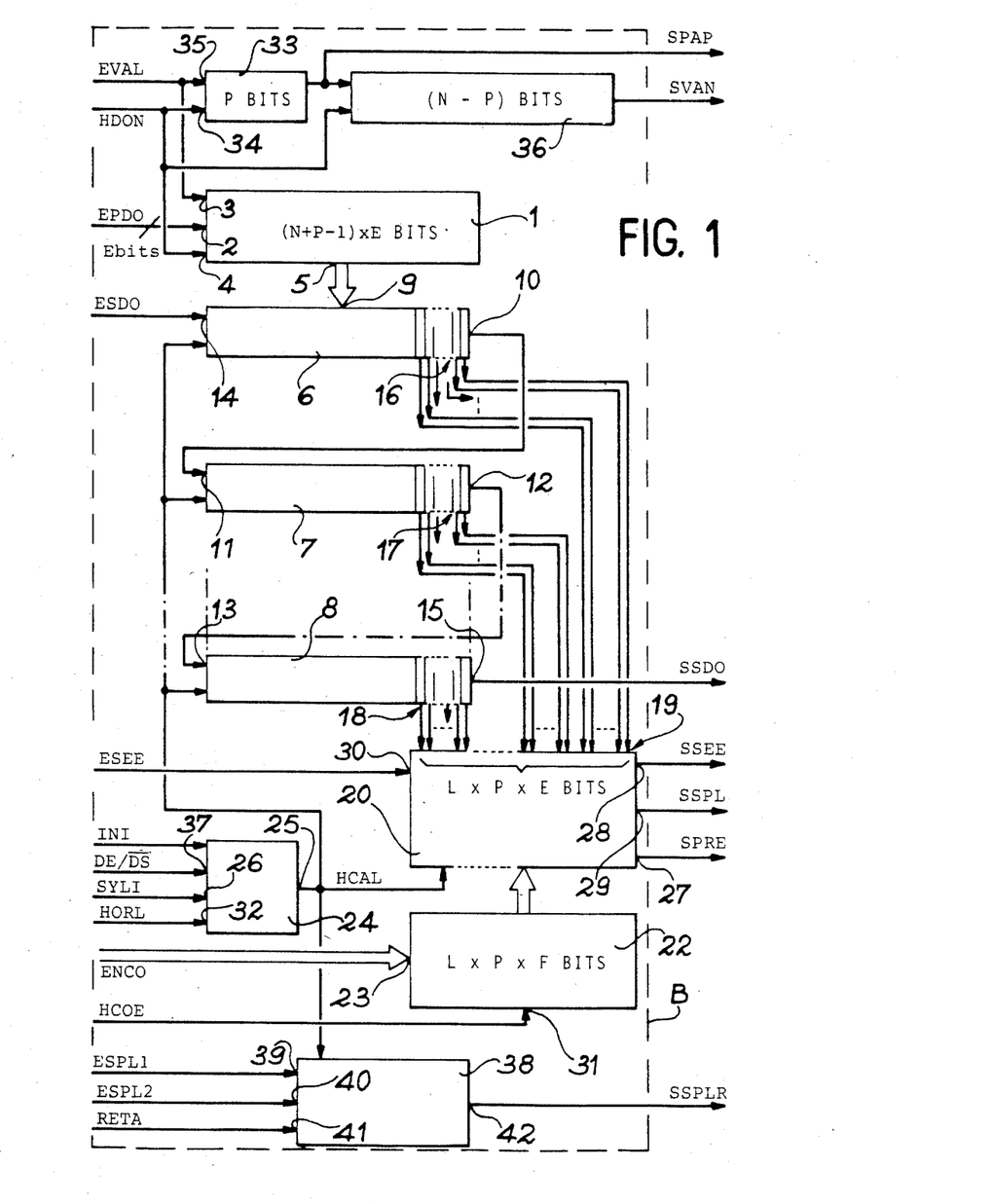
FIG. 1—In detail manner a basic module used in the processing process according to the invention.

FIG. 1 shows in detailed manner one of the basic modules used in the processing process according to the invention. This basic module is able to process an image having N image elements or pixels per scanning line, each image element being defined by a number E of bits representing a complement 2 coded quantity and the convolution processing is performed in a window of dimensions $L \times P$, centred on the image element being processed. This module can be called a basic module because, as will be shown in greater detail hereinafter, the original image, whose image elements are to be processed has different characteristics. This original image can have a number of image elements per scanning line, which is a multiple of the number of image elements N which can be processed by the basic module. In said original image, each image element can be defined by a number of bits, which is a multiple of the number of bits E defining each image element which can be processed by the basic module. Finally, each image element of the original image can also be processed by a convolution window, whose dimensions $L' \times P'$ exceed the dimensions $L \times P$ of the window which can process the basic module.

As indicated hereinbefore, it is assumed that the convolution window has, for the basic module B of FIG. 1, dimensions L, P (L being the number of lines in the window and P the number of coefficients of each line in said window). This basic module B comprises a buffer shift register 1 having a capacity of $(N+P-1) \times E$ bits, receiving on an input 2 called EPDO, the E data bits relative to all the image elements of a scanning line, having N image elements of E bits each. This register has a capacity of $(N+P-1) \times E$ bits to take account of the "edge effects" encountered in an image of N image elements per line, when the chosen window has a width of P image elements. Shift register 1 also receives on another validation input 3, a signal EVAL and on a clock input 4 a clock signal HDON. The clock signal makes it possible to record the E bits of a new data present on the input EPDO and shift by one position the data already acquired in register 1. Clock register HDON is only active if signal EVAL is raised to logic value 1.

When all the bits defining the N image elements of a scanning line, as well as the $(p-1)/2$ preceding image elements and the $(p-1)/2$ following image elements (edge effects) have been recorded in register 1, the $(N+P-1) \times E$ bits are transferred in parallel from the output 5 of register 1 to the input 9 of register 6. This transfer is initiated by the appearance of sync signal SYLI on input 26 of the hereinafter described control circuit 24.

In the case where the convolution window defined for said basic module has a dimension of L lines of P image elements each, said basic module also comprises L shift registers 6, 7, 8 (3 registers in the represented embodiment, where it is assumed that the window is defined by L=3 lines of P=3 image elements). The first register 6 comprises parallel inputs 9 connected to the parallel outputs 5 of register 1. Each of these registers comprises a series output. Series output 10 of register 6 is connected to a series input 11 of register 7. The series output 12 of register 7 is connected to a series input 13 of register 8. Each register 6, 7, 8 has a capacity of $(N-P+1) \times E \times 1$ bit. As will be shown in greater detail hereinafter, for certain embodiments of this basic module in the process of the invention, the first register 6 of the series of L registers has a series input 14 able to receive data ESDO from another similar basic module. The bits representing data ESDO relate to image elements already processed by another basic module. The final register 8 of the series of L registers also comprises a series output 15 supplying bits representing data SSDO relating to image elements which have already been processed in this basic module. The $P \times E$ last cells of each of the L registers 6, 7, 8 are respectively connected by parallel outputs 16, 17, 18 of said registers to $L \times P \times E$ inputs of a known convolution operator 20 as described in the documents referred to hereinbefore and which makes it possible to obtain the sums of successive convolution products defined by the equation:

$$b_{i,j} = \sum_{l=1}^{L} \sum_{k=1}^{P} \left( a_{i+l-\frac{L+1}{2}, j+k-\frac{P+1}{2}} \right) \times c_{l,k}.$$

This convolution operator receives on $L \times P \times F$ inputs 21, the bits representing coefficients $C_{l,k}$ applied to the processing of each image element by a window of $L \times P$ image elements, each coefficient being defined by F bits. These coefficients are loaded into a memory 22 receiving on an input 23 called ENCO, the F bits of each of the complement 2 coded coefficients. These coefficients are stored by applying a clock signal HCOE to one input 31 of memory 22. Each shift register 6, 7, 8 of the series of L registers receives a clock signal HCAL supplied by the output 25 of control circuit 24. This signal is also applied to the convolution operator 20 for carrying out the convolution calculation, on the basis of all the bits relative to a scanning line and on the basis of coefficients $C_{l,k}$.

The convolution operator 20 has an output 27 supplying bits representing data SPRE coded on 6 bits and corresponding to the image elements of the convoluted image. This convolution operator also comprises outputs 28 and 29. Output 28 supplies data SSEE corresponding to partial convolution results, in the case where the image to be processed has N image elements per line, each image element being defined by a number of bits which is a multiple of the number E of bits defining each image element of the basic image. The series output 29 supplies data SSPL relative to the partial convolution results in the case where the image to be processed has N image elements of E bits per scanning line, but in which the chosen convolution window has dimensions which are respectively larger than the dimensions of the convolution window in which the basic module performs processing operations.

The convolution operator 20 also has a series input 30 receiving data ESEE representing the partial convolution results from the output SSEE of another basic module, in the case where the image to be processed comprises N images element per scanning line, but in which each image element is defined by a number of bits which is a multiple of the number of bits E of each image element which can be processed by the basic module.

Control circuit 24 receives control signal DE/$\overline{DS}$ and SYLI respectively on its inputs 37 and 26 and a clock signal HORL on input 32, as well as signal INI making it possible to initialize the complete basic module. On the basis of these signals, control circuit 24 supplies a clock signal HCAL within the module and which is used for sequencing the processing operations necessary for obtaining the N image elements of the convoluted image. Moreover, the control circuit 24 supplies the signals necessary (not appearing in FIG. 1) for initializing the different elements by signal INI, for the transfer of the content of register 1 to register 6 controlled by the appearance of signal SYLI and necessary for the processing module for differentiating the case where the E data bits of the original image are required to code unsigned numbers from the case where these E bits are required to code the signed numbers, as a function of the logic state of the control signal DE/$\overline{DS}$.

According to the invention, the aforementioned basic module also comprises a first secondary shift register 33 having a capacity of P bits receiving on inputs 34, 35 the clock signals HDON, as well as the validation signal EVAL. One series output of this shift register is connected to a series input of a secondary shift register 36 with a capacity of (N−P) bits, said second register receiving on another input the clock signal HDON. At its output, the first register 35 supplies a signal SVAP making it possible to validate, in the manner shown hereinafter, the recording of the data in another module identical to the basic module, in the case where the convolution window chosen for processing the original image has dimensions L', P', which respectively exceed the dimensions L, P of the processing window of the basic module. Thus, a signal SVAP is supplied as soon as the number of image elements recorded in this module exceeds the number P of image elements defining the processing window of the basic module. The second window 36 supplies a signal SVAN of a series output. This signal SVAN makes it possible to validate the recording of data in another module identical to the basic module when the number of image elements per line of the original image is a multiple of the number N of image elements per line which can be processed by the basic module. Thus, this signal is supplied by a basic module as soon as the number of image elements recorded in the module exceeds the number N of image elements which can be processed by the basic module.

Moreover, the basic module is provided with a series adder 38 receiving the signal HCAL from the internal processing clock, supplied by the control circuit 24. This one bit series adder performs the addition of one bit appearing at the input 39 called ESPL1 with either one bit appearing at the same time on input 40 called ESPL2 if the signal RETA, applied to input 41, is raised to logic state "0", or one bit at input 40, one clock cycle HCAL earlier if signal RETA is raised to logic state "1". In the process of the invention, this adder is used in the case where the convolution window chosen for processing the original image has dimensions L' and P' respectively exceeding the dimensions L and P of the basic module processing window, as will be shown hereinafter.

Figure 2:
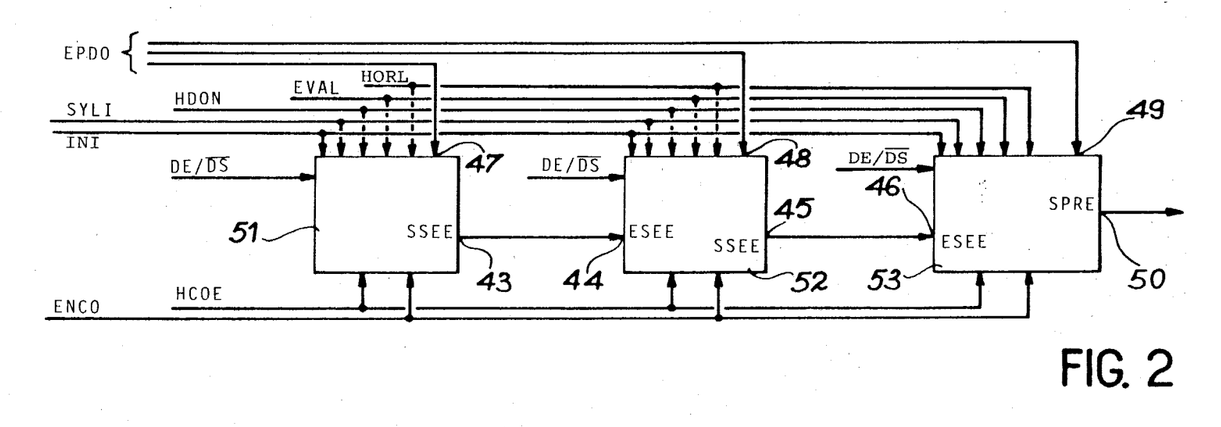
FIG. 2—Diagrammatically an association of several basic modules used in the process according to the invention, in the case where each image element of each original image has a number of bits which is a multiple of the number of bits which can be processed by each basic module.

FIG. 2 diagrammatically shows an interconnection of n basic modules identical to that of FIG. 1 used in the present invention, in the case where the number H of bits of each image element of the original image to be processed is a multiple of the number E of bits of each image element which can be processed by the basic module ($H=n\times E$). In the present case, these basic modules 51, 52, 53 make it possible to process image elements comprising $H=3\times E$ bits. The H bits coding in complement to each image element of the original image are subdivided into N groups of E bits. At its input EPDO, each module receives a corresponding group of E bits. In the chosen case ($H=3E$), input 47 of module 51 receives the E high order bits. Input 48 of module 52 receives the E medium order bits, whilst input 49 of module 53 receives the E low order bits. The representative data of each image element are designated EPDO in the drawing.

The E high order bits of data EPDO processed in module 51 are assumed to code a signed number and the signal DE/$\overline{DS}$ of said module is fixed in logic state "0". The E medium order bits and low order bits of the data processed respectively in modules 52 and 53 code unsigned numbers and the signal DE/$\overline{DS}$ of said modules is fixed to logic state "1". The processed data output SSEE of a module is connected to a processed data input ESEE of the following module. Thus, for example, output 43 of the first module 51 is connected to input 44 of the second module 52 and output 45 of module 52 is connected to input 46 of module 53.

The data SPRE relating to each image element of the convoluted image are supplied in the form of G bits on output 50 of the final module 53. Each of the modules also receives the signals EVAL, HDON, HORL, INI and SYLI described hereinbefore, as well as the signals HCOE and ENCO.

Thus, when the data relative to each image element are coded on a number of bits which is a multiple of the number of bits which can be processed by each basic module, the inventive process consists of the association in cascade of several modules identical to the basic modules, performing partial convolution processing operations, then adding the results of these partial processing operations by taking account of the fact that the partial results are represented with different orders or weights.

Figure 3:
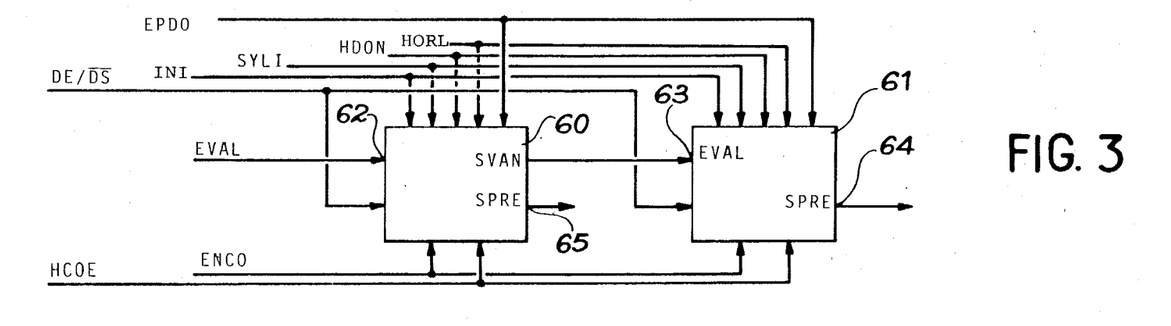
FIG. 3—Diagrammatically an association of several basic modules used in the process according to the invention, in the case where each scanning line of the original image comprises a number of image elements which is a multiple of the number of image elements which can be processed by each basic module.

FIG. 3 diagrammatically shows the interconnection of modules identical to the basic module which, according to the inventive process, makes it possible to obtain the convoluted image of an original image, when the predetermined number N' of image elements per line of said original image is a multiple of the number N of image elements per line of the basic image, such that $N'=q\times N$. The process then consists of marking from rank 1 to rank q, each group of N image elements of the original image and interconnecting q basic modules marked from rank 1 to rank q.

For each line of the original image, the rank 1 module receives the bits of each image element of the group of N image elements of rank 1, as well as the bits of the $(p-1)/2$ preceding image elements and the $(p-1)/2$ following image elements of said line and so on up to the rank q module, which receives the bits of the group of N image elements of rank q. On its processed data output SPRE, each module supplies N image elements corresponding to each of the groups of ranks 1 to q of each line of the convoluted image.

In the represented example, it is assumed that each line of the original image comprises $N'=2N$ image elements. The process then consists of using two identical basic modules 60, 61, which receive the data EPDO, relative to the image elements of each line. These modules also receive the signals HDON, HORL, INI and SYLI, as well as DE/$\overline{DS}$. As a result of the signal EVAL applied to its input 62, the first module processes the N first image elements of each line. As a result of a signal EVAL applied to its input 63 and coming from the validation output SVAN of the first module 60, the second module 61 processes the N following image elements of each line.

Each module also receives the signals ENCO and HCOE. On an output 65, the first module supplies processed data SPRE, which relate to the N first image elements of each line of the convoluted image, the data SPRE being coded on G bits. At its output 64, the second module 61 supplies the data SPRE relative to the N following image elements of each line of the convoluted image.

Figure 4A:
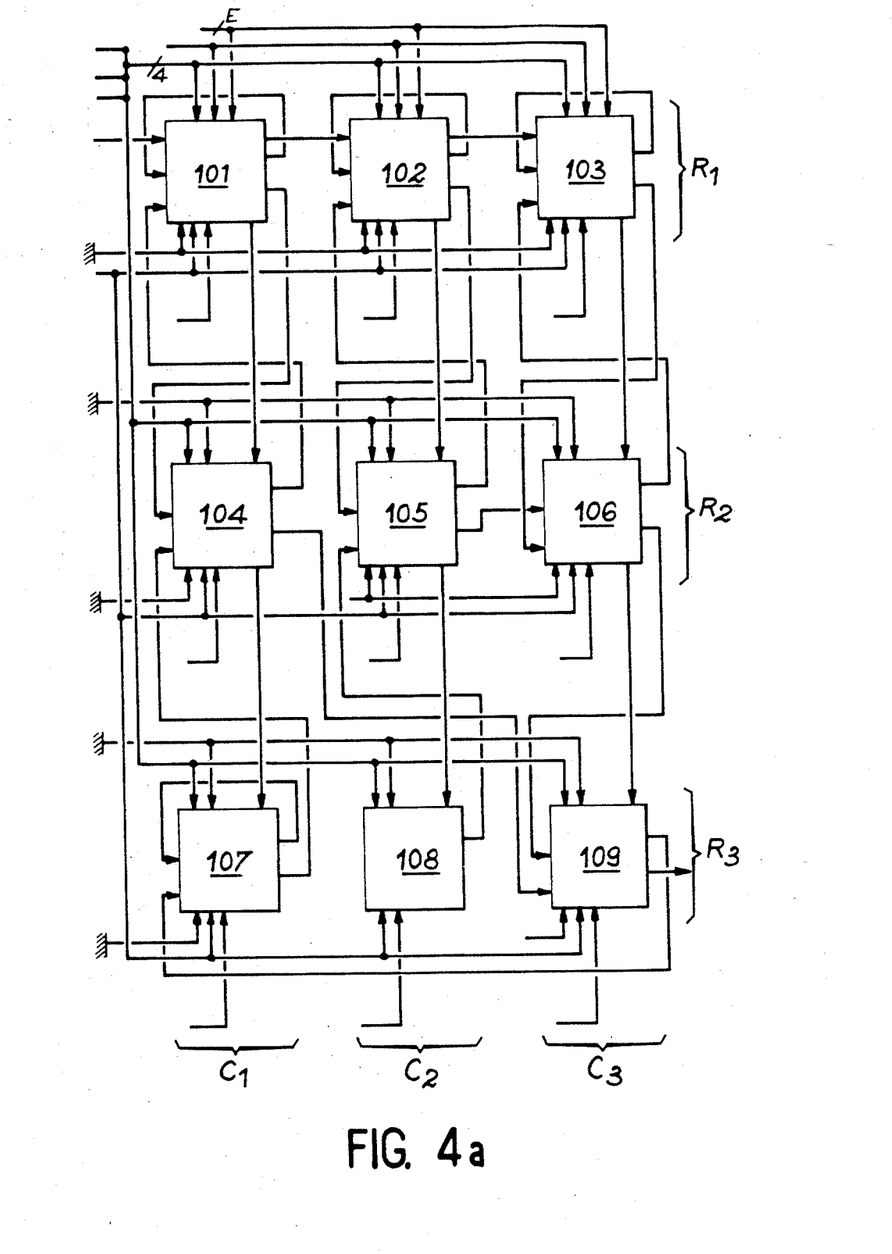
FIGS. 4A, 4B, 4C and 5—Diagrammatically an association of basic modules used in the process according to the invention in the case where the convolution window chosen for the processing of the image elements of the original image has dimensions exceeding those of the convolution window in which each basic module can process each image element.
Figure 4B:
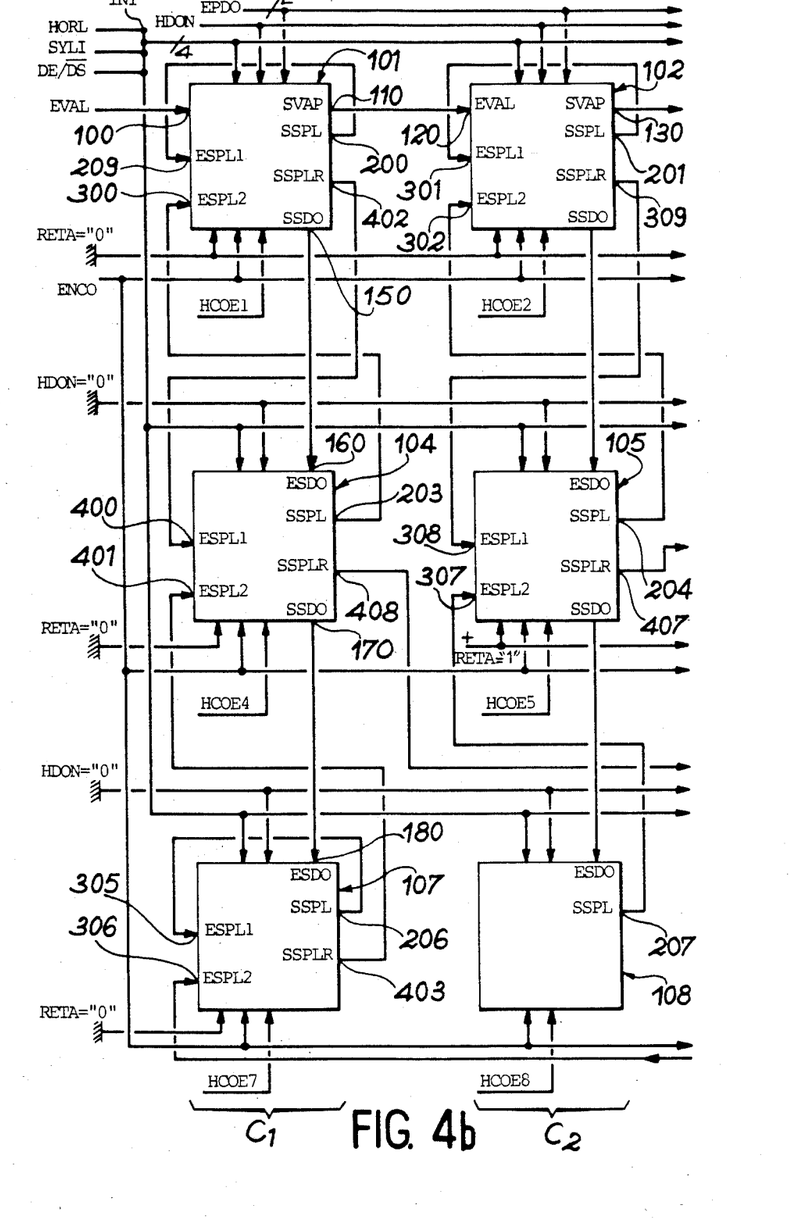
Figure 4C:
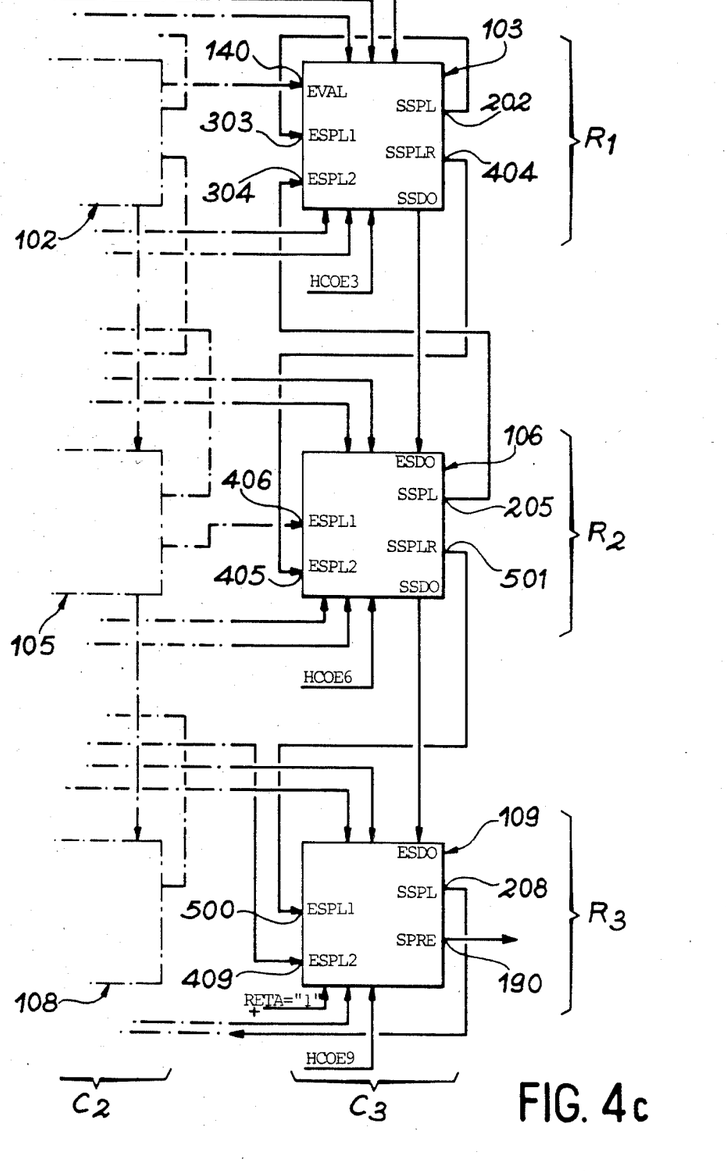

FIGS. 4A, 4B and 4C diagrammatically represent an interconnection of modules identical to the basic modules, in the case where the window dimensions $L'\times P'$ chosen for processing each image element of the original image respectively exceed the dimensions $L\times P$ of the processing window of the basic module. In this case the process consists of interconnecting $r\times s$ basic modules according to r rows $R_1$, $R_2$, $R_3$ and s columns $C_1$, $C_2$, $C_3$, in such a way that the S modules of the first row $R_1$ receive the bits of each image element of S groups of $N+P-1$ image elements of the original image, each group being displaced by P image elements with respect to the preceding group and the $r-1$ modules of the same column from the second row $R_2$ to the final row $R_3$ receive the bits of image elements already processed in the preceding module of said same column. In the presently described example $r=s=3$. Thus, the 3 modules 101, 102, 103 of the first row $R_1$ receive on input EPDO, the E bits of the image elements of each of the lines, as well as the clock signal HDON. The recording of the data in module 101 is validated by the appearance of signal EVAL on input 100 of said module. Signal EVAL is maintained until the bits of the $N+P-1$ image elements of each of the lines are recorded. On its output 110 called SVAP, module 101 generates a signal corresponding to the preceding signal EVAL delayed by P clock cycles from signal HDON, the output 110 of module 101 being connected to input 120, also called EVAL, of the following module 102. Thus, said signal makes it possible to record in module 102 the bits of a group of $N+P-1$ image elements displaced by P image elements with respect to the group recorded in module 101. In the same way, module 102 generates on its output 130, called SVAP, a signal corresponding to the signal present on input 120, delayed by P clock cycles relative to signal HDON, the output 130 of module 2 being connected to the input 140, called EVAL, of module 3. Thus, said signal makes it possible to record in module 103, the bits of a group of $N+P-1$ image elements displaced by P image elements with respect to the group recorded in module 102.

Modules 104, 105, 106, 107, 108, 109 of the following rows $R_2$, $R_3$ do not receive signals EPDO and HDON. Input HDON of said modules is maintained at logic level "0", thus making it possible to validate the series input ESDO of said modules. Output 150, called SSDO, of module 101 is connected to input 160, called ESDO, of module 104, which is the following module of the first column $C_1$. Output 170 of module 104 is connected to input 180 of the following module 107 of said same column $C_1$. The same connections are formed between modules 102, 105 and 108 of the second column $C_2$ and between modules 103, 106, 109 of the third column $C_3$. Thus, the bits of the image elements recorded in module 101 are in series on the output 150 of said module at the rate of the calculating clock HCAL, after undergoing a delay of L lines or $L(N+P-1)E$ clock cycles of signal HCAL. These bits are then recorded at the same rate, in module 104, at the level of the first shift register 6 of FIG. 1. The same applies regarding the passage from module 104 to module 107. The same reasoning applies for each of the other columns. All these columns receive the signals INI, HORL, DE/$\overline{DS}$. They also receive all the bits of the coefficients on input ENCO. These bits are stored in each of the modules 101 to 109 respectively by each of the clock signals HCOE1 to HCOE9. Thus, the storage of $L \times P$ coefficients of the module 101 is performed by $L \times P$ clock cycles of signal HCOE1, the other clock signals being maintained in logic state "0". The storage of the $L \times P$ coefficients of module 102 is carried out by $L \times P$ clock cycles of signal HCOE2, the other clock signals being maintained at logic state "0". This is continued up to the storage of the $L \times P$ coefficients of module 109 by clock signal HCOE9.

Each of the modules 101 to 109 supplies on its output, called SSPL, a series convolution result corresponding to the window portion processed by each of these modules. The following interconnections consist of forming the sum of all these partial results in four phases, in order to obtain a final result which, in the present example, is supplied by module 109 on the output 190, called SPRE and which supplies G bits. In the first phase, output SSPL of modules 101 to 109 respectively designated 200 to 208 are connected in pairs to the available series adders in each of the modules. Thus, output 200 of module 101 is connected to input 209, called ESPL1, of said same module and output 203 of module 104 is connected to input 300, called ESPL2, of module 101. In the same way, output 201 of module 102 and output 204 of module 105 are respectively connected to inputs 301, 302 of module 102; output 202 of module 103 and output 205 of module 106 are respectively connected to inputs 303, 304 of module 103; output 206 of module 107 and output 208 of module 109 are respectively connected to inputs 305, 306 of module 107. Output 207 of module 108 is connected to the input 307, called ESPL2, of module 105. The adders of modules 101, 102, 103 and 107 each have their two inputs connected to outputs supplying bits of the same order. Therefore, for these modules, signal RETA is fixed at logic level "0", each of the adders forming the sum of two bits of the same order and supplying the same order result to output SSPLR following one clock cycle of signal HCAL. Signal RETA of module 105 is fixed at logic level "1" in order to delay by one clock cycle the bit of input ESPL2, which is added to a bit from output 309 of module 102, output SSPLR of the adder of said module, which has been delayed by said adder. The adder of module 105 is used for the second summation phase of the partial results, as well as the adder of module 104, whereof the two inputs 400 and 401 are respectively connected to the outputs 402, 403 of the adders of modules 101 and 107 and whereof the signal RETA is fixed at logic level "0". The output 404 of the adder of module 103 is connected to the input 405, called ESPL2, of module 106. Signal RETA of said module is fixed at logic level "1" for the same reason as described hereinbefore for module 105. Thus, the adder of module 106 performs the third summation phase between the delayed bits of its input 405 and the bits of its input 406 connected to the output 407 of module 105. Output 408 of module 104 is connected to input 409, called ESPL2, of module 109. Signal RETA of said module is fixed at logic level "1" for the same reason as described hereinbefore for module 105. Thus, the adder of module 109 performs the fourth summation phase of the partial results between the delayed bits of its input 409 and the bits of its input 500 connected to output 501 of module 106. The results of N image elements of each line are then available at the output 190 of module 109 in the form of G bits.

Figure 5:
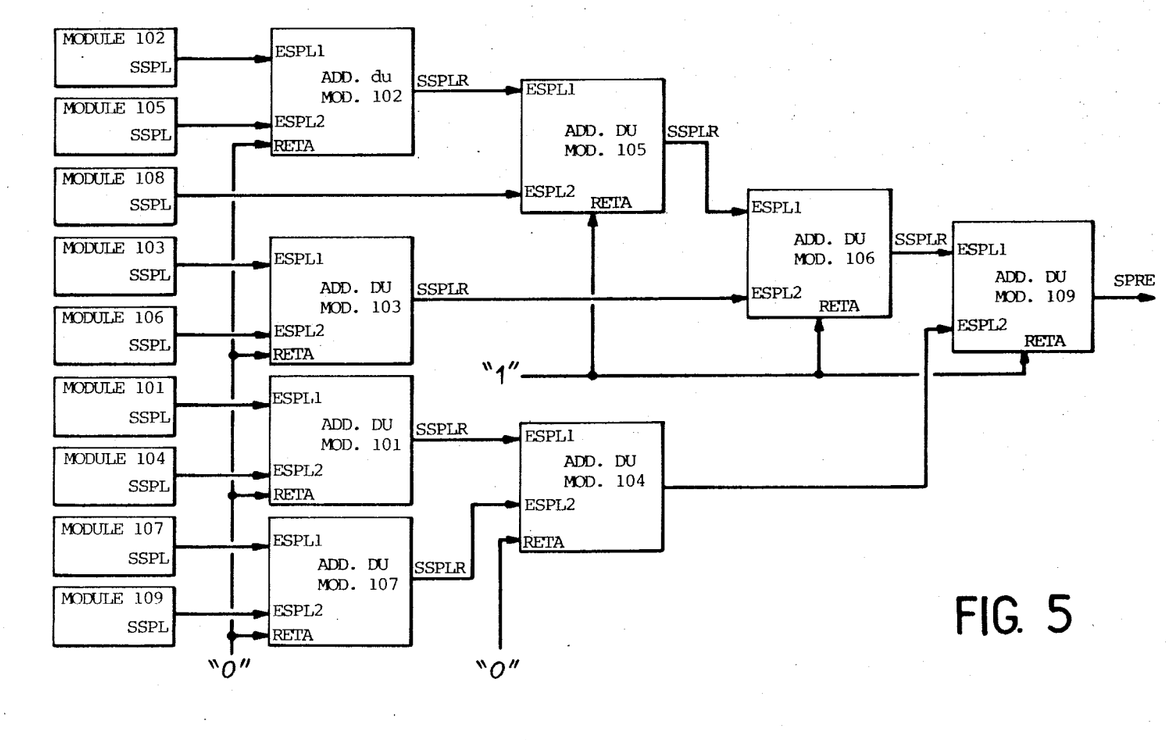

Thus, the summation of the partial results obtained by each of the modules 101 to 109 is performed in series and in four phases, as indicated in FIG. 5. The first phase consists of adding in pairs the results supplied by modules 101 and 104, 102 and 105, 103 and 106 and 107 and 109. The second phase consists of adding on the one hand in module 105 the results supplied in delayed form by module 108 to the results supplied by the adder of module 102 and on the other hand in module 104 the results supplied by the adders of modules 101 and 107. The third phase consists of adding in module 106 the result supplied by the adder of module 103 in delayed form and the result supplied by the adder of module 105. Finally, the fourth phase consists of adding in module 109 the result supplied by the adder of module 104 in delayed form and the result supplied by the adder of module 106. Thus, in the case of an interconnection of $r \times s$ modules, there is a summation of $r \times s$ partial results in the adders having two inputs described hereinbefore. This summation of $r \times s$ partial results requires $\gamma$ calculation phases, $\gamma$ being such that $2^{\gamma-1} < r \times s \leq 2^{\gamma}$.

In the case where the dimensions L' and P' of the chosen window exceed the dimensions L and P of the basic module processing window, it is appropriate to perform the interconnection of $r \times s$ modules:

$R = 1 + $ integral portion of $L'/L$ $s = 1 + $ integral portion of $P'/P$.

The s modules of the first row receive the bits of each image element of a group of N image elements of the original image, as well as the bits of $(p-1)/2$ preceding image elements and $(p-1)/2$ following image elements, corresponding to an elementary window of p image elements per line. The $r-1$ modules of the same column receive the bits of the preceding module of the same column (following a delay corresponding to L lines) during the performance of the processing operation. In this case, the process consists, starting from an original image of N image elements per line marked from 1 to N, subdividing each line into s groups of $N+P-1$ image elements, each group being displaced by P image elements with respect to the preceding group. The rank 1 group comprises $N+P-1$ image elements marked from $-(L'-1)/2$ to $N+P-1-(L'-1)/2$, the rank 2 group comprising $N+P-1$ image elements makred from $-(L'-1)/2+P$ to $N+2P-1-(L'-1)/2$, and so on up to the group of rank s comprising $N+P-1$ image elements marked from $-(L'-1)/2+(S-1)P$ to $N+sP-1-(L'-1)/2$.

What is claimed is:

1. A process for the processing of digitized signals representing an original image defined by scanning lines, each line having a predetermined number of image elements or pixels, each pixel being defined by a predetermined number of bits, comprising the steps of selecting basic modules for the processing by convolution of pixels of a basic image (B), said basic image comprising N pixels per line, each pixel being defined by E bits, each pixel of the basic image being processed in a convolution window defined by its dimensions L×P comprising L×P weighting coefficients organized in L rows and P columns, said basic module comprising at least one data processing input (2) for receiving the E bits of each pixel of a line of N pixels and at least one output (27) for supplying N processed data corresponding to the processing of each pixel of the basic image, the process then consisting of interconnecting modules identical to the basic module for obtaining the convoluted image of the original image, in accordance with a network in which the number of modules and their interconnections depend on:
- a predetermined number H of bits defining each pixel of the original image, said number H being a multiple of the number E of bits defining each pixel of the basic image, such that $H = n \times E$,
- a predetermined number N' of pixels per original image line, said number N' being a multiple of the number N of pixels per line of the basic image, such that $N' = q \times N$,
- dimensions L'XP' of a chosen window for processing each pixel of the original image, said dimensions exceeding the dimensions L×P of the basic module window.

2. A process according to claim 1, wherein in the case where the number H of bits of each pixel of the original image is a multiple of the number E of bits of each pixel of the basic image, such that $H = n \times E$, said process comprises the step of interconnecting n basic modules in series, so that a processed data output (43) of one module (51) is connected to a processed data input (44) of the following module (52), the H bits of each pixel of the original image being subdivided into N groups of E bits, each module receiving at its data processing input a corresponding group of E bits, the processed data output (50) of the final module of the series supplying the bits of each pixel of the convoluted image.

3. A process according to claim 1, wherein in the case where the predetermined number N' of pixels per line of original image is a multiple of the number N of pixels per line of the basic image, such that $N' = q \times N$, said process comprises the step of marking from rank 1 to rank q each group of N pixels of the original image and interconnecting q basic modules marked from rank 1 to rank q, so that for each line of the original image, the rank 1 module (60) receives the bits of each pixel of the group of N pixels of rank 1, as well as the bits of the $(p-1)/2$ preceding pixels and the bits of the $(p-1)/2$ following pixels and so on, so that the rank q module (61) receives the bits of the group of the N pixels of rank q and receives the bits of the $(p-1)/2$ preceding pixels and the bits of the $(p-1)/2$ following pixels, each module supplying at its processed data output (64 or 65) N corresponding pixels of each line of the convoluted image.

4. A process according to claim 1, wherein in the case where the dimensions L'×P' of a window chosen for processing each pixel of the original image exceed the dimensions L×P of the processing window of the basic module, said process comprises the step of interconnecting r×s basic modules in r rows and s columns, so that the s modules of the first row receive the bits of each pixel of S groups of $N+P-1$ pixels of the original image, each group being shifted by P pixels with respect to the preceding group and so that the $r-1$ modules of each of the columns receive the bits of pixels already processed in the preceding module of the same column, the process then consisting of interconnecting adders available in each module so as to form the sum of the partial convolution results supplied by each module on a serial output (SSPL), said summation of r×s partial results being performed in series in adders having two inputs and requiring $\gamma$ calculating phases, such that $2^{\gamma-1} < r \times s \leq 2^{\gamma}$.

* * * * *